United States Patent [19]
Haraikawa

[11] 3,752,273
[45] Aug. 14, 1973

[54] DUAL HYDRAULIC BRAKE SYSTEM
[75] Inventor: Tetsuo Haraikawa, Funabashi-shi, Chiba-ken, Japan
[73] Assignee: Tokico Limited, Kanagawa-ken, Japan
[22] Filed: May 25, 1971
[21] Appl. No.: 146,707

[52] U.S. Cl............... 188/345, 60/54.5 E, 188/349, 303/6 C
[51] Int. Cl.............................................. B60t 11/20
[58] Field of Search........................... 188/345, 349; 60/54.5 E, 0.6 E; 303/6 C

[56] References Cited
UNITED STATES PATENTS
3,486,591 12/1969 Scheffler.................. 188/345 X
3,610,378 10/1971 Goddard.................... 188/345

*Primary Examiner*—George E. A. Halvosa
*Attorney*—Sughrue, Rothwell, Mion, Zinn & Macpeak

[57] ABSTRACT

In a dual hydraulic brake system the front wheels are each provided with disc brakes or two leading shoe and drum type brakes and the rear wheels are each provided with leading-trailing shoe and drum type brakes. The higher pressure brake system is applied to the trailing shoe in the rear brake system and a portion of the front braking piston and the lower pressure brake system is applied to the leading shoe in the rear braking piston and another portion of the front braking piston. By selecting the piston areas and pressures the ratio of the braking force between the front and rear braking units can be maintained not only under normal conditions but even if one of the hydraulic systems is disabled.

4 Claims, 1 Drawing Figure

Patented Aug. 14, 1973
3,752,273
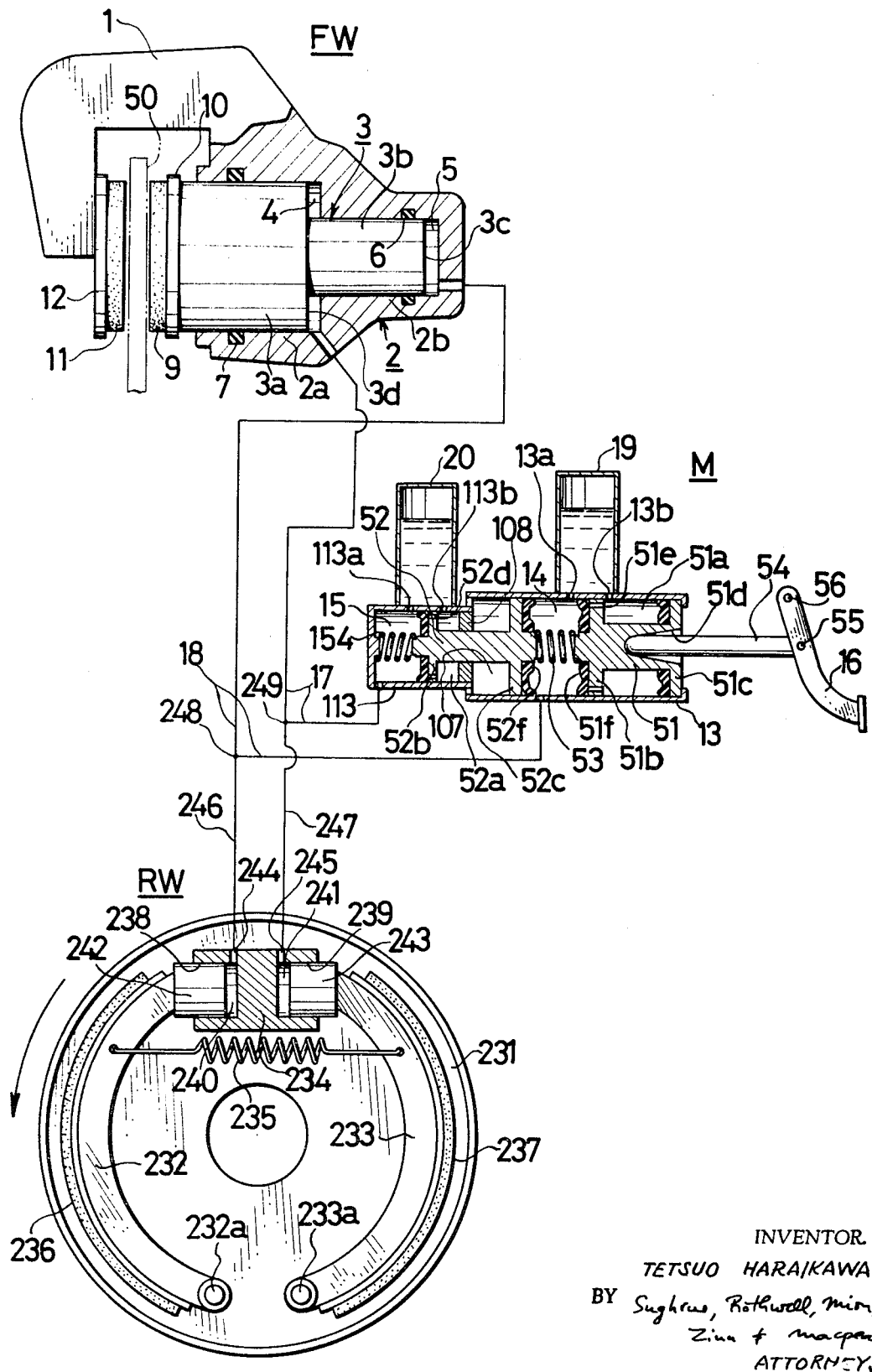
INVENTOR.
TETSUO HARAIKAWA
BY Sughrue, Rothwell, Mion,
Zinn & Macpeak
ATTORNEYS

DUAL HYDRAULIC BRAKE SYSTEM

This invention relates to improvements in and relating to a dual hydraulic brake system for a powered vehicle with front and rear wheel pairs wherein disc brake or two-leading shoes type drum brake units are fitted to the front wheel pair, and leading-trailing shoes drum brake units are fitted to the rear wheel pair, respectively.

It is a common sense to those skilled art that in any vehicle wheel brake system, the design ratio of the brake force distribution between the front and rear wheel pairs, for instance 6 : 5, must as most as possible be preserved during the operation of the brake system.

On the other hand, when a pressure failure such as by an accidental pipe burst or the like cause should take place in either of the system elements composing the dual hydraulic brake system, the braking forces developed in the disabled and the regularly operatable system elements or units must preferably and substantially be equal to each other, in order to assure the safety in the wheel braking operation.

In the dual hydraulic brake system wherein at least a leading-trailing shoes drum brake unit be employed, the arrangement is such that one of the system elements or units operates the leading shoe(s) and the other system element the trailing shoe(s) and independently from each other through a piston-cylinder assembly. The both braking forces applied to these differently functional brake shoes from these mutually independent hydraulic system elements must also preferably be equal to each other, not only for the purpose of operational safety as above referred to, but also for maintaining the wearing rate of frictional elements of all the brake shoes. It is commonly known that equal brake forces can not be generated with leading type brake shoes and tailing type brake shoes by application of equal piston forces upon these shoes, and that the brake force generated with the former type shoe is substantially larger than that generated with the latter type one in this case. It will be necessary to use correspondingly different piston forces for actuating these different type brake shoes so as to develop equal braking force thereat. The piston diameters must naturally be different for the realization of same braking forces at these different type pistons, when these pistons are actuated with equal hydraulic pressures. Therefore, the bore of a brake cylinder alloted to a trailing shoe of a shoe-drum brake unit must be correspondingly larger than that of the cylinder for a leading shoe of the brake unit, and under circumstances, the aforementioned optimum braking condition could not be realized on account of the thus required space or the like requirement.

The main object of the present invention is to provide a dual hydraulic brake system of the above kind, capable of substantially obviating the above various conventional drawbacks and of satisfying the above desire by those skilled in the art.

This and further objects, features and advantages of the invention will become more apparent as the description proceeds by reference to the accompanying drawing illustrative in somewhat schematic and partially sectioned of a preferred sole embodiment of the invention.

In the DRAWING, illustrative of the sole embodiment of the invention, numeral 1 represents a conventional calliper which straddles, a brake disc 50 shown only schematically and partially in chain-dotted line on account of its very popularity. This brake disc is so arranged that it rotates, as commonly known, in unison with an automotive front vehicle wheel when the vehicle is running.

A hydraulic brake cylinder 2 rigid with calliper 1 is of a stepped design and comprises a larger diameter part 2a and a smaller diameter part 2b. A stepped hydraulic piston 3 comprising a larger part 3a and a smaller part 3b is slidably mounted in the cylinder 2. A first and ring-shaped pressure chamber 4 is formed between the right-hand end of larger piston part 3a and the corresponding end wall of larger cylinder part 2a. A second pressure chamber 5 is formed between the right-hand end of smaller piston part 2b and the corresponding end of smaller cylinder part 2b.

Sealing ring 6 is provided between smaller cylinder part 2b and smaller piston part 3b, preferably on the latter as shown, for interruption of a fluid communication between first and second pressure chambers 4 and 5. A further sealing ring 17 is provided between larger cylinder part 2a and larger piston part 3a, preferably on the latter as shown, for interruption of fluid leakage from the first pressure chamber 4 to outside.

Although not shown, a ring-shaped resilient dust cover made of soft rubber or plastic material, one end thereof being fixedly attached to the right-hand end of larger cylinder part 2a and the other end thereof being fixedly attached to the right-hand end of larger piston part 3a, is provided.

A friction pad 9 made of a friction- and heat resistant material, such as asbestos is rigidly attached to a carrier 10 which is in turn made rigid with the outer end of larger piston part 3a. A further friction pad 11 made of same friction- and heat resistant material, is rigidly attached to a carrier 12 which is rigid with calliper 1. As shown, these pads 9 and 11 are arranged in opposition to each other and provide normally respective small idle gaps relative to brake disc 50 when the brake cylinder unit so far shown and described is in its off-service position shown.

As the hydraulic pressure source for the brake cylinder unit, a tandem type master cylinder 13 is used, said master cylinder containing a first hydraulic piston 51 and a second hydraulic piston 52 slidably mounted therein. These pistons 51 and 52 are rigidly attached with respective sealing caps 51f and 52f and an intermediate spring 53 is inserted between the pistons under compression. Between these pistons, a first hydraulic chamber 14 is formed within the master cylinder and contains said intermediate spring 53. A further spring 154 is provided in a second hydraulic chamber 15 formed at the left-hand end of the master cylinder 13 and between the related end wall thereof and the outer end of second piston 52.

First piston 51 is formed with an axial recess 51d receiving the inner end of a push rod 54 which is linked at 55 to a conventional foot-operated brake pedal 16. This pedal 16 is pivotably mounted at 56 on the chassis, not shown, of an automotive vehicle which is fitted with the hydraulic brake system shown and described so far.

First hydraulic chamber 14 and second hydraulic chamber 15 are hydraulically connected through respective connection pipings 17 and 18 to first and second pressure chambers 4 and 5, respectively.

As will be seen as the description proceeds, a first brake system element or unit comprises said first hydraulic chamber 14, piping 17 and first pressure chamber 4 and a second brake system comprises said second hydraulic chamber 15, piping 18 and second pressure chamber 5, thus the whole brake system representing a dual type concerning the related vehicle wheel. As is commonly known, the pipings 17 and 18 may preferably be connected with similar first and second pressure chambers of a similar wheel brake cylinder unit of the same type, not shown, attached to a mating front vehicle wheel.

On the master cylinder 13, a first oil reservoir 19 is fixedly mounted, the interior oil space of which is fluidically connected through a first port 13a with the first hydraulic chamber 14 the liquid chamber contained therein of which is kept in fluid communication through a first port 13a formed through the wall of cylinder 13, with said first hydraulic chamber 14, and through a second port 13b with a ring chamber 51a defined between piston flanges 51b and 51c of first piston 51, said first hydraulic chamber and said ring chamber communicating hydraulically in the direction from the latter to former. For this purpose, the piston flange 51b is formed with at least a horizontal perforation as at 51e. With the dual brake system in its off-service position shown in FIG. 1, the ports 13a and 13b are situated at the both sides of piston flange 51b and a slight distances therefrom.

The cylinder 13 is formed coaxially with a reduced extension 113 which includes therein said second hydraulic chamber 15 and fixedly mounts second reservoir 20 the liquid space of which is hydraulically connected through a first port 113a formed through the reduced cylinder 113, with second hydraulic chamber 15 containing said urging spring 154. A second port 113b is also formed through the wall of cylinder extension 113 and the liquid space of second reservoir 20 is hydraulically connected therethrough with ring space 52a defined by and between the flange 52b and closure plate 108. Second hydraulic chamber 15 and ring chamber 52a are kept in fluid communication with each other in the direction from the latter to the former. For this purpose, piston flange 52b is formed with at least a horizontal perforation 52d in the similar way as at 51e. With the brake system positioned in its off-service position as shown, these ports 113a and 113b are situated at the both sides of first piston flange 52b.

Air chamber 107 is formed at the right-hand end of cylinder proper 13 and between closure plug 108 and piston flange 52c and kept in pneumatic communication with open atmosphere.

Rear brake unit RW constructed into a leading-trailing shoes type drum brake comprises a stationary backing plate 231, a leading shoe 232 pivotably mounted thereon at 232a, a trailing shoe 233 pivotably mounted again on the plate 231 at 233a, a wheel brake cylinder 234 and a return spring 235 resiliently connecting the both shoes 232 and 233 in the mutually attracting direction.

Shoes 232 and 233 carry thereon respective friction elements 236 and 237 which, when brake force is applied as will be described more in detail hereinafter, are arranged frictionally to cooperate the inside wall surface of a brake drum concentrically arranged with backing plate 231 and to rotate in unison with one of the rear vehicle wheels, although not shown for purposes of clarity of the drawing and on account of their very popularity. Normally, however, respective proper idle gaps are maintained between the friction elements 236 and 237, on the one hand, and the brake drum, on the other hand.

Wheel cylinder 234 is formed with oppposedly arranged, open end bores 238 and 239 fluidically separated from each other and receiving slidably respective brake pistons 242 and 243. Between the inner end of piston 242 and the related cylinder end wall, there is formed a hydraulic pressure chamber 240. In the similar way, a further pressure chamber 241 is formed at the inner end of cylinder bore 239. The exposed outer end parts of pistons 242 and 243 are kept in pressure contact with the upper ends of brake shoes 232 and 233, respectively.

Pressure chamber 240 is hydraulically connected through a port 244 drilled through the corresponding cylinder wall, a connection piping 246 extending between said port 244 to a junction 248 positioned in the piping 18. In the similar way, pressure chamber 241 is hydraulically connected through a port 245 drilled again through the corresponding cylinder wall, a further connection piping 247 extending between said port and a junction 249 positioned in the piping 17.

Although not shown only for simplicity of drawing, the pipings 246 and 247 are connected through piping means, not shown, respectively to similar pressure chambers as at 240 and 241 of a further hydraulic drum brake of the same design as of RW fitted to the remaining one of the vehicle rear wheels, again not shown.

As seen from the foregoing, a first hydraulic system element or unit which may be called "system A" comprises first hydraulic pressure chamber 14, pipings 18 an 246, first pressure chambers 5 of units 2 for front wheels and pressure chambers 240 for rear wheels. In the similar way, a second hydraulic system element or unit which may be called "system B," comprises second hydraulic chamber 15, pipings 17 and 247, second pressure chambers 4 of units 2 for front wheels and pressure chambers 241 for rear wheels.

The operation of the dual hydraulic brake system according to the invention shown and described so far is as follows:

When the driver of the vehicle desires to exert brake force to the vehicle when running, he depresses the brake pedal 16 as conventionally, motion will be transmitted therefrom through push rod 54 to first piston 56 against the action of spring 53, thereby the piston being advanced and the hydraulic pressure in first pressure chamber 14 being increased correspondingly. Then, second piston 52 will be urged to move in the same direction by virtue of the action of the thus further compressed spring 53 and the increased hydraulic pressure in the first pressure chamber 14 which acts upon the larger piston flange 52c of second piston 52 against the action of return spring 154. In this way, the hydraulic liquid in second pressure chamber 15 is unit M being thereby increased. By virtue of the diametrally dimensional difference between smaller piston flange 52b and larger piston flange 52c, the hydraulic pressure prevailing in second pressure chamber 15 included in the system B is correspondingly higher than that prevailing in first pressure chamber 14 included in the system A.

In this case, there is a certain predetermined differential between the higher hydraulic pressure prevailing in the second system B and the lower hydraulic pressure prevailing in the first system A.

By the pressurizing the both systems A and B in the above mentioned way, the brake pistons 3 of front wheel brake units are urged hydraulically to advance together with friction pads 9 and their back-up members 10 against the respective brake discs 50. In this case, the urging pressure applied upon the piston 3 is a combination of the lower hydraulic pressure now prevailing in the first system A multiplied by the end surface 3c of smaller piston part 3b, and the higher hydraulic pressure now prevailing in the second system B multiplied by the ring-shaped pressure-receiving surface 3d of larger piston part 3a. Calliper 1 is subjected to the equal value of hydraulic reaction caused by the pressurization of both systems A and B. In effect, the friction pads 9 and 11 are brought into pressure engagement with the rotating disc 50 at its both surfaces, for effecting a braking effort to the related front vehicle wheel. Naturally, the same braking operation is performed in the remaining brake unit, not shown, of the other front wheel.

By the pressurization of the first or lower pressure system A, piston 242 is urged hydraulically to advance outwardly so that the leading shoe 232 is expanded pivotingly against the brake drum. At the same time, the trailing shoe 233 is also expanded outwardly upon the pressurization of the first or high pressure system B. In this way, a higher brake pressure is applied to the latter shoe 233 than the former shoe 232 on account of the equal effective areas of the both brake pistons 242 and 243. This braking operation is also performed in the mating brake unit relating to other rear wheel.

It is now assumed that the first or lower pressure system A has been disabled by loss of the hydraulic pressure caused by pipe burst or similar occasional accident. Upon depression of pedal 16 in this case, the remaining and effective hydraulic system B will naturally be pressurized and brake pistons 3 and 242 are actuated to provide braking efforts in the both units FW and RW.

If the second system B is disabled in place of first system A, it will be easily seen that in this case pistons 3 and 243 are actuated to perform a braking system operation in the both units FW and RW.

It is further assumed that the following nomenclature is employed:

$A_m$ : effective surface area of first master cylinder piston 51;

$B_m$ : effective surface area at 52b of second master cylinder piston 52;

$A_f$ : effective working area 3c of smaller piston part 3b of brake piston 3 of front wheel brake unit FW;

$B_f$ : effective working area at 3d of larger piston part 3a of brake piston 3 of front wheel brake unit FW;

$A_r$ : effective working area of first piston 242 cooperating with leading brake shoe 232 of rear wheel brake unit RW;

$B_r$ : effective working area of piston 243 cooperating with trailing brake shoe 233 of rear wheel brake unit RW;

$$K = \frac{\text{front wheel braking torque}}{\text{braking force exerted by brake piston 3}}$$

$$S_a = \frac{\text{rear wheel braking torque exerted by leading shoe 232}}{\text{shoe-urging force exerted by the related piston 242}}$$

$$S_b = \frac{\text{rear wheel braking torque exerted by trailing shoe 233}}{\text{shoe-urging force exerted by the related piston 243}}$$

In order to keep the braking force allocation to the front and rear brake units FW and RW at a certain predetermined ratio (such as 6 : 4 for instance), not only under the effective and normally workable conditions, but also in the case of disabled condition of either hydraulic system A or B, the following formula must be satisfied:

$$K \cdot A_f/S_a \cdot A_r = K \cdot B_f/S_b \cdot B_r$$

Therefore, $$A_f/B_f = S_a \cdot A_r/S_b \cdot B_r \ldots \quad (1)$$

On the other hand, when the braking forces applied to the units FW and RW by pressurization of the first hydraulic system A and those applied to the same brake units by pressurization of the second hydraulic system B should be equal to each other, the following formula must be satisified:

$$A_f/B_f = S_a \cdot A_r/S_b \cdot B_r = A_m/B_m \ldots \quad (2)$$

Therefore, when the formula (2) is satisfied, the first requirement to maintain the practical brake force allocation among the front and rear wheels at a certain originally intended ratio, and the second requirement to equalize the respective braking forces generated by actuation of the first and the second hydraulic systems A and B can be fulfilled.

It is proposed according to the present invention to specifically select the effective working area of each of the brake pistons in the both brake units FW and RW, so as to satisfy the above formula (2), for fulfilment of the above mentioned two operational requirements.

When now observing the technical relationship between the tandem type master cylinder unit M and the leading-trailing shoes type drum brake unit RW adapted for braking the rear wheel, the following formula can be derived from the above formula (2):

$$A_r/B_r = S_b \cdot A_m/S_a \cdot B_m = S_b \cdot A_f/S_a \cdot B_f \ldots \quad (3)$$

where, $S_a$ is larger than $S_b$; and $A_m$ is larger than $B_m$, when the condition specified by the formula (2) must be satisfied. It is therefore possible to make the ratio $A_r/B_r$ precisely or nearly equal to unity when obeying the improved teaching according to the present invention. On the contrary according to prior art, $A_m$ is selected to be equal to $B_m$ and the hydraulic pressures developed in the first and second pressure chambers in the tandem master cylinder are selected equal to each other and the leading and trailing shoes of a drum brake as at RW are actuated under the above mentioned conditions, the ratio $A_r/B_r$ will become far from unity, which represents a substantial drawback in the prior art.

When obeying the principle according to the invention, otherwise possible difference between $A_r$ and $B_r$, or more specifically, between the bore diameters of the actuating cylinders for the leading and trailing brake shoes, respectively, of a leading and trailing shoes type drum brake for a rear vehicle wheel may minimized precisely or practically to nil, even under the satisfying conditions of a certain brake force allocation among the front and rear wheel brake units which fact provides various operational, design and manufacturing advantages over prior art.

Under occasion, a two leading type drum brake can be used for the front vehicle wheel, in place of the disc brake unit FW within the spirit and scope of the present invention. In this modification, although not shown for simplicity of the description, the value of ratio: braking force generated by shoe urging force applied by shoe-actuating brake piston can be made to have a certain constant value for every leading shoes of the drum brake. In this case, the aforementioned features of the disc brake so far described can equally be maintained. In this modification, the shoe-actuating cylinder hydraulically connected with the second or higher pressure hydraulic system may have a correspondingly smaller bore diameter than that of another shoe-actuating cylinder which is connected with the first or lower pressure hydraulic system. This possibility will naturally provide design and manufacturing advantages over the prior art one.

The embodiments of the invention in which an exclusive property or privilege is claimed are as follows:

1. A dual hydraulic brake system for a powered vehicle including at least a front and a rear wheel, wherein a disc brake unit is fitted to the front wheel and a leading-trailing type drum brake unit is fitted to the rear wheel, each of said brake units being actuated in a dual manner from two different pressure sources of different lower and higher pressure levels and having respective cylinders and pressure-generating pistons slidably contained therein, said disc brake unit being provided with first two cylinder means and respective piston means slidably received therein, said first two cylinder means being hydraulically connected respectively with said higher and lower pressure sources, said leading-trailing type drum brake unit being provided with second two cylinder means and respective piston means slidably received therein, said second two cylinder means being hydraulically connected respectively with said higher and lower pressure sources, the dimensions of related parts being selected to satisfy the following formula:

$$A_f/B_f = S_a \cdot A_r/S_b \cdot B_r = A_m/B_m$$

where, $A_m$ is the effective working area of the piston destined for generation of the lower source pressure;

$B_m$ is the effective working area of the piston destined for generation of the higher source pressure;

$A_f$ is the effective working area of one of the first piston means hydraulically connected with the lower pressure source;

$B_f$ is the effective working area of the remaining one of the first piston means hydraulically connected with the higher pressure source;

$A_r$ is the effective working area of one of the second piston means hydraulically connected with the lower pressure source;

$B_r$ is the effective working area of the remaining one of the second piston means hydraulically connected with the higher pressure source;

$S_a$ is the ratio between the braking torque generated by the leading side shoe devided by the piston force for actuation of the leading side shoe of the leading-trailing type drum brake unit; and $S_b$ is the ratio of the braking torque generated by the trailing side shoe divided by the piston force for actuation of the trailing side shoe of the latter drum brake unit.

2. A dual hydraulic brake system as defined in claim 1, wherein the related parts are so dimensionally selected that the following formula is substantially satisfied:

$$A_r/B_r = S_b\, A_m/S_a\, B_m = S_b\, A_f/S_a\, B_f = 1$$

3. A dual hydraulic brake system as defined in claim 1, wherein said respective piston means slidably received in said second two cylinder means comprise two pistons slidably received in two separate cylinders and actuated independently of each other by said respective higher and lower pressure sources, one of said pistons independently actauting a leading shoe of said rear wheel drum brake, the other piston independently actuating the trailing shoe of the rear wheel drum brake.

4. A dual hydraulic brake system as defined in claim 3, wherein said piston independently actuating the leading shoe of said rear wheel drum brake is hydraulically communicated with said lower pressure source and the piston independently actuating the trailing shoe of said rear wheel drum brake is hydraulically communicated with said higher pressure source.

* * * * *

UNITED STATES PATENT OFFICE
CERTIFICATE OF CORRECTION

Patent No. 3,752,273          Dated    August 14, 1973

Inventor(s)   Tetsuo Haraikawa

It is certified that error appears in the above-identified patent and that said Letters Patent are hereby corrected as shown below:

In The Heading:

The Claim to Priority was omitted. Should read:

May 26, 1970          Japan..............45063/1970

Signed and sealed this 5th day of March 1974.

(SEAL)
Attest:

EDWARD M. FLETCHER, JR.           C. MARSHALL DANN
Attesting Officer                 Commissioner of Patents